2,993,551
THREE WHEELED SPRAY VEHICLE WITH FRAME TANK

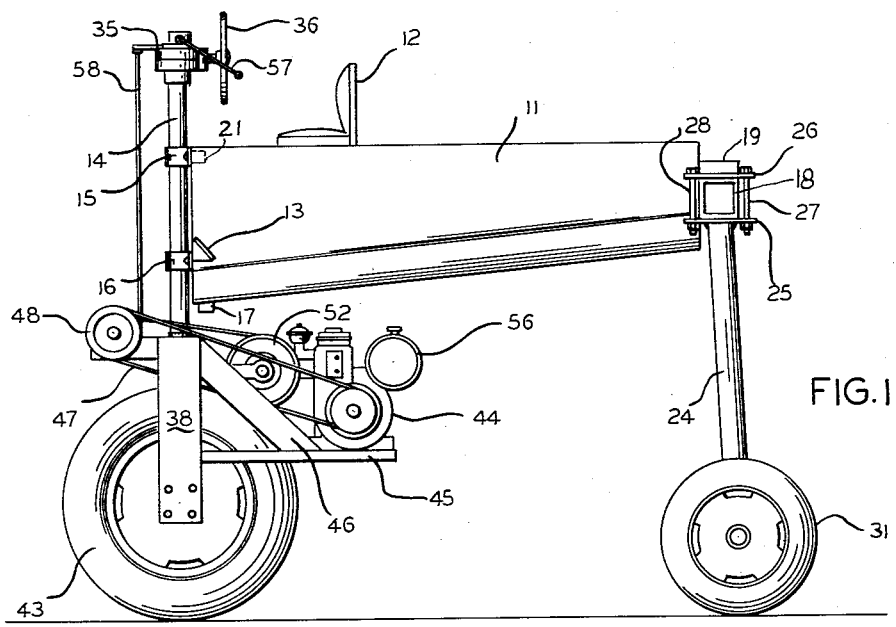
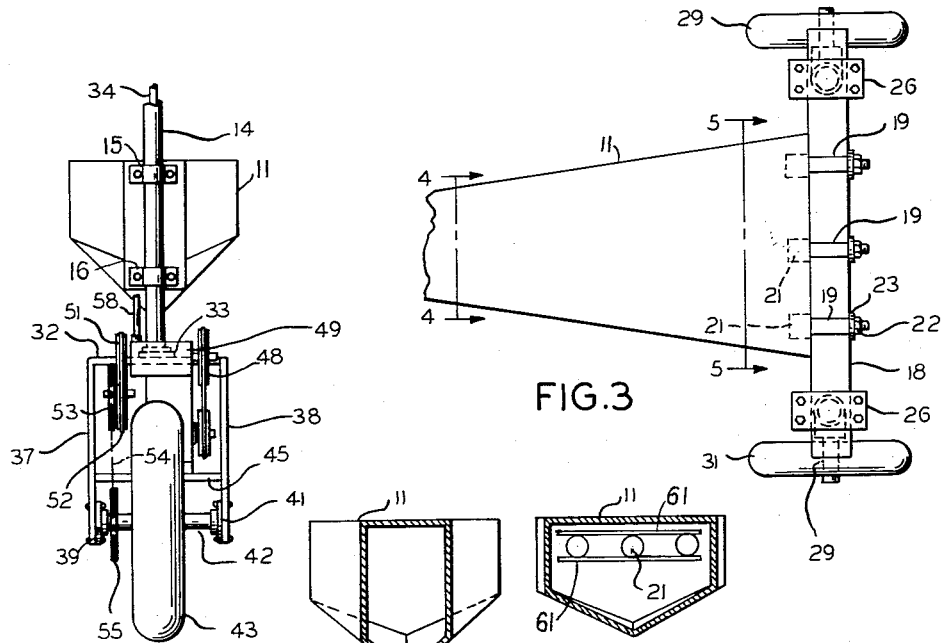

George A. Finley, Aurora, and Carl A. Anderson, Batavia, Ill., assignors to Finco, Inc., Aurora, Ill., a corporation of Illinois
Filed June 22, 1959, Ser. No. 822,148
3 Claims. (Cl. 180—26)

This invention relates to an improved form of a 3-wheeled vehicle provided with a large tank for transporting liquids such as agricultural sprays of various kinds. An example of such a vehicle is shown in U.S. Patent 2,822,216, issued February 4, 1958, to Finco, Inc., the assignee of this application. In that patent there is shown a 3-wheeled vehicle and a pair of spray liquid tanks, mounted above and in front of the two rear wheels of the vehicle. Thus the liquid tanks had to pass through the row crops.

The present invention provides a 3-wheeled vehicle which is especially designed to be shipped in disassembled form, to be assembled at the place of use, and using as a part of the frame of the assembled device a relatively large tank, elevated above the tops of the row crops, in which the spray liquid may be stored during the operation of the vehicle.

The general purpose of the invention is to provide a vehicle of this class which may be shipped disassembled and readily assembled on the job, utilizing primarily functional parts of the device to constitute the frame thereof.

Particular objects and advantages of the invention will be mentioned hereinafter or will become apparent from a perusal of this specification.

The drawing illustrates a preferred form of the invention in which FIGURE 1 is a side elevation of an assembled vehicle. FIGURE 2 is a front elevation, omitting the rear wheels.

FIGURE 3 is a top plan view of the rear portion of the assembled vehicle. FIGURE 4 is a vertical sectional view of the tank on the line 4—4 of FIGURE 3, and FIGURE 5 is a vertical sectional view of the tank on the line 5—5 of FIGURE 3.

Referring now to the drawing, the longitudinal frame member of the vehicle is the liquid storage tank 11, which is wide at its rear end to gain greater capacity and increase the frame rigidity. The tank is narrow at its front end, to permit the operator to have the seat 12 placed thereon and to conveniently straddle the tank with his legs. A suitable foot rest such as 13 may be provided, or other suitable place for supporting the feet on opposite sides of the tank. As the front end of the tank is secured to the tubular steering column housing 14, the front end of the tank is not only narrower, but deeper, than the rear end, thus enabling widely spaced pipe straps 15 and 16 to be placed around the housing 14. An outlet port 17 is provided at the front end of the tank for connection with a pipe (not shown) leading to the spray system or other liquid-distributing system. The pipe straps may be bolted to the tank by bolts extending inwardly of the tank and terminating in internally threaded sockets which are sealed by welding to the inner surface of the tank wall.

The rear end of the tank, wider and shallower than the front end, is conventionally secured to the vehicle by welding to the top of the rear hollow tubular frame member 18 a plurality of sleeves of rectangular cross section, such as 19, each of which is open at its front and rear ends. When the machine is being assembled, long bolts may then be extended through these sleeves, their inner ends threaded into internally threaded sockets such as 21, welded and sealed to the inner surface of the tank, while the rear end of each bolt will be provided with a nut 22 and washer 23. Thus the tank, when being shipped in the disassembled condition, has no protruding parts thereon that are essential to its being accurately secured to the rest of the vehicle and which parts might be damaged in transit; yet, when the pipe straps and the bolts at the rear are secured as explained, the frame connection between the front and rear portions of the vehicle will be very rigid and capable of standing considerable strain.

Each rear leg such as 24 is preferably a hollow tube such as a pipe, to the upper end of which is welded a plate 25 which may be clamped to the transverse frame member 18 by using another plate 26 and the bolts 27 and 28. Each leg 24 carries a laterally extending stub axle 29 on which may be mounted a wheel such as a pneumatically tired wheel 31.

The steering column housing 14, to which the tank is rigidly secured, is connected to a horizontal plate 32 by journaling its lower end in a suitable bearing 33. A rotatable steering post 34 extending through suitable and conventional spaced bearings supported on the interior of the housing, is rigidly secured at its lower end to the frame plate 32 in any suitable manner for rotating that plate and the front wheel assembly relatively to the housing 14. At the upper end of the steering column, in a suitable gear case 35, there are mounted suitable gears connected in any conventional manner to the steering post and the steering wheel 36 whereby the operator may steer the front wheel assembly.

Rigidly depending from the frame plate 32 are vertical frame plates 37 and 38, carrying on their lower ends suitable bearings 39 and 41 in which is journaled the rotatable shafts 42 on which is fixed the front wheel 43. These frame plates 32, 39 and 41 are part of a rigid frame assembly, which is supported on the wheel and which carry on them the motor and various parts of the gear drive and speed reduction mechanism. As the bulk of this assembly and the operative units are positioned to the rear of the steering column, increased stability is attained by locating their considerable weight in that location. The motor 44 is mounted on the rearwardly extending horizontal frame plate 45, which is appropriately connected to the side frame plates by means of a pair of inclined braces such as 46. A belt 47 from the pulley of the motor extends forwardly to a pulley 48 on a conventional variable speed reduction gear mechanism generally indicated as 49. This gear reduction unit is mounted on the top plate 32 and drives the front wheel by means of a series of pulleys and conventional belts such as 51, 52 and 53, the latter being connected by a chain 54 to a sprocket 55 secured on the front rotatable axle 42. Gasoline for this motor may be carried in a tank 56. The motor and associated pulleys, gears and belts are conventional and are subject to some variation as may be desired.

The operator may vary the speed of the vehicle by means of a conventional shift lever 57, and a shifting rod 58, which is connected with the variable speed mechanism, all of which is conventional.

When this vehicle is being made ready for shipment, the motor unit may be packed and crated separately, but the rest of the front wheel assembly and steering column casing 14 and associated parts may be pre-assembled as a unit and shipped in that manner, if desired.

The rear wheels may or may not be pre-assembled on their supporting legs 24, as desired, while the tank and seat may be separated and packed separately. Thus the buyer gets a disassembled vehicle which can be put together conveniently and in a rather short time.

The three-wheeled vehicle made in accordance with this invention is not only adapted for the general spraying of insecticides and weed sprays on row crops, but is especially well suited for the spraying of tall crops without injury to them. Some sprayers heretofore available could not pass through tall crops such as fairly mature corn without serious damage to the crop. The spray vehicle of this invention is designed for easy passage through tall row crops by mounting the spray tank in a generally horizontally extending position at a high level in the entire assembly, making the front end of the tank so narrow that it readily passes between adjoining rows, while the rear portion of the tank has a higher clearance and is widened out in a gradually expanding taper which causes the top portions only of the row crops, if not cleared, to be gradually and gently bent apart from each other without injury to them.

Other advantages accompany this tank design and the manner of mounting it. For example, the narrow but vertically deep front end can be attached to the steering column at widely spaced positions, while the vertically shallow but horizontally wide rear end of the tank can be attached to the rear cross frame member at several points well spaced apart, which makes it practical to use the tank itself as the central longitudinal frame member in a very rigid overall assembly.

Additionally, the forward narrow end can be and is made narrow enough for the operator to be seated on it and to straddle it as he occupies the seat 12.

Since the forward end of the tank slopes downwardly, a flexible outlet hose is conveniently attached to the outlet port 17 and leads to a pump (not shown) which may be carried on the motor support frame and which will deliver the liquid spray rearwardly through flexible hose to conventional spray booms carried by the rear end of the vehicle, but not shown herein as these connections may be conventional equipment.

In order not to impose undue strain upon the front vertical and rear vertical walls of the tank, it is preferred that the internally threaded sockets such as 21, welded to these front and rear vertical walls, be reinforced by bars such as 61, which are welded to these sockets and also welded to the adjacent tank wall with which they connect. Such reinforcing bars are shown in FIGURE 5. Similar ones, not shown but extending vertically, connect and reinforce the sockets to which the pipe straps 15 and 16 are bolted. If desired, additional tubes such as 19 shown in FIGURE 3 may be welded also to the underside of the rear transverse frame member 18 and bolts and sockets to co-act with them may be provided corresponding with those which co-act with the row of sleeves 19 shown in FIGURE 3.

While a preferred embodiment of the invention has been shown and described to illustrate the nature of the invention and the manner of its use, it should be understood that some variations and modifications therein may be made without departing from the spirit and scope of the invention defined in the appended claims.

Having shown and described the invention, we claim:

1. A high clearance self-propelled three wheeled spray vehicle comprising a front vertical tubular stationary column and a front wheel frame, the lower end of the column being journaled on said frame, a steering post extending through and supported on said column having its lower end rigidly secured to said frame for rotating the frame relatively to the column, said frame including a pair of depending side plates, a wheel rotatably mounted upon and between said plates, said frame having an extension rearwardly of the wheel axle, a motor and motor driven means positioned and supported on said rearward extension connected for rotating said wheel, a high level transverse rear frame member, a pair of depending legs at opposite ends of said transverse member having their top ends detachably connected to said member and each having a wheel rotatably supported on its lower end, a spray liquid tank extending longitudinally of the vehicle having a relatively narrow front end and a relatively wide rear end constituting a rigid frame member between said column and said transverse member, a driver's seat positioned on top of the forward end portion of said tank, means detachably securing the front end of the tank to said column at relatively widely and vertically spaced apart positions, and means securing the rear end of the tank to said transverse member at longitudinally and widely spaced apart positions.

2. A high clearance self-propelled three wheeled spray vehicle comprising a front vertical tubular stationary column and a front wheel frame, the lower end of the column being journaled on said frame, a steering post extending vertically and supported on said column and connected to the frame adapted for rotating the frame relatively to the column, said frame including a pair of depending side plates, a wheel rotatably mounted upon and between said plates, said frame having an extension rearwardly of the wheel axle, a motor and motor driven means positioned and supported on said extension connected for rotating said wheel, a high level transverse rear frame member and legs depending from and detachably connected to opposite ends of said member, a wheel rotatably supported on the lower end of each leg, a spray liquid tank extending longitudinally of the vehicle constituting a rigid frame member between said column and said transverse member, means detachably securing the front end of the tank to said column at vertically spaced apart positions, and means detachably securing the rear end of the tank to said transverse member, a driver's seat positioned on top of the forward end portion of said tank, the forward portion of said tank being relatively deep and narrow enough to be comfortably straddled by the legs of a driver in said seat, while the rear end is relatively much wider and secured at widely spaced points to the transverse member.

3. A high clearance self-propelled three wheeled spray vehicle comprising a front vertical tubular stationary column and a front wheel frame, the lower end of the column being journaled on said frame, a steering post supported on said column and connected to the frame adapted for rotating the frame relatively to the column, a front wheel rotatably mounted on said wheel frame, a motor and motor driven means supported on said frame connected for driving said wheel, a high level transverse frame member and legs depending from and connected to opposite ends of said member, a wheel rotatably supported on the lower end of each leg, a spray liquid tank extending longitudinally of the vehicle constituting a rigid frame member between said column and said transverse member, means securing the front end of the tank to said column at vertically and widely spaced apart positions, means securing the rear end of the tank to said transverse member, a driver's seat positioned on top of the forward end portion of said tank, the forward portion of the tank being relatively deep and narrow enough to be comfortably straddled by the legs of a driver in said seat, while the rear end of the tank is relatively much wider and is secured at widely spaced points to the transverse member.

References Cited in the file of this patent

UNITED STATES PATENTS

| | | |
|---|---|---|
| 1,840,481 | Wickersham | Jan. 12, 1932 |
| 2,362,658 | Meyer | Nov. 14, 1944 |
| 2,704,158 | Long | Mar. 15, 1955 |
| 2,786,585 | Davis et al. | Mar. 26, 1957 |
| 2,822,216 | Finley et al. | Feb. 4, 1958 |